US011957171B2

(12) United States Patent
Yoon

(10) Patent No.: US 11,957,171 B2
(45) Date of Patent: Apr. 16, 2024

(54) AEROSOL GENERATING DEVICE

(71) Applicant: KT&G CORPORATION, Daejeon (KR)

(72) Inventor: Sung Wook Yoon, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 811 days.

(21) Appl. No.: 16/971,930

(22) PCT Filed: Apr. 23, 2020

(86) PCT No.: PCT/KR2020/005391
§ 371 (c)(1),
(2) Date: Aug. 21, 2020

(87) PCT Pub. No.: WO2020/218855
PCT Pub. Date: Oct. 29, 2020

(65) Prior Publication Data
US 2023/0141848 A1    May 11, 2023

(30) Foreign Application Priority Data

Apr. 25, 2019   (KR) .................. 10-2019-0048608

(51) Int. Cl.
*A24F 40/46* (2020.01)
*A24F 40/48* (2020.01)
(Continued)

(52) U.S. Cl.
CPC .............. *A24F 40/46* (2020.01); *A24F 40/48* (2020.01); *A24F 40/90* (2020.01); *H02J 7/0044* (2013.01)

(58) Field of Classification Search
CPC .......... A24F 40/46; A24F 40/48; A24F 40/90; A24F 40/20; A24F 40/40; H02J 7/0044; H05B 3/04; H05B 3/44
See application file for complete search history.

(56) References Cited

U.S. PATENT DOCUMENTS 9,220,304 B2   12/2015  Greim
9,427,025 B2    8/2016  Liu
(Continued)

FOREIGN PATENT DOCUMENTS

CN         203353690 U    12/2013
CN         104256895 A     1/2015
(Continued)

OTHER PUBLICATIONS

Chinese Office Action dated Feb. 8, 2023 in Chinese Application No. 202080001466.7.
(Continued)

*Primary Examiner* — Jean F Duverne
(74) *Attorney, Agent, or Firm* — Sughrue Mion, PLLC

(57) ABSTRACT

An aerosol generating device may include a heater configured to heat an aerosol generating article; a heater flange supporting one end of the heater; a heat barrier coupled to the heater flange and surrounding the heater without contact; and a housing accommodating the heater and the heat barrier, wherein a fastening member is formed on one of the heater flange and the heat barrier, and an accommodating portion for accommodating the fastening member is formed on the other of the heater flange and the heat barrier, and wherein the heater flange and the heat barrier are coupled to each other by the fastening member and the accommodating portion.

12 Claims, 8 Drawing Sheets

(51) Int. Cl.
   *A24F 40/90*   (2020.01)
   *H02J 7/00*   (2006.01)

(56) References Cited

U.S. PATENT DOCUMENTS

| | | | |
|---|---|---|---|
| 9,532,603 B2 | 1/2017 | Plojoux et al. | |
| 9,867,399 B1 | 1/2018 | Liu | |
| 10,058,125 B2* | 8/2018 | Worm | ............... A61M 15/0021 |
| 2014/0182608 A1 | 7/2014 | Egoyants et al. | |
| 2014/0305449 A1 | 10/2014 | Plojoux et al. | |
| 2014/0338686 A1 | 11/2014 | Plojoux et al. | |
| 2015/0245655 A1 | 9/2015 | Memari et al. | |
| 2018/0070639 A1 | 3/2018 | Chen et al. | |
| 2018/0271171 A1 | 9/2018 | Abramov et al. | |
| 2019/0208816 A1 | 7/2019 | Thorsen | |
| 2019/0380389 A1 | 12/2019 | Hong et al. | |
| 2020/0086068 A1 | 3/2020 | Lee et al. | |
| 2020/0154768 A1 | 5/2020 | Han et al. | |
| 2020/0253280 A1 | 8/2020 | Thorsen | |
| 2021/0227875 A1 | 7/2021 | Zhurba et al. | |

FOREIGN PATENT DOCUMENTS

| | | | | |
|---|---|---|---|---|
| CN | 105747279 A | | 7/2016 | |
| CN | 107223023 A | * | 9/2017 | ............. A24F 40/00 |
| CN | 206612214 U | | 11/2017 | |
| CN | 206923683 U | | 1/2018 | |
| CN | 207855048 U | | 9/2018 | |
| CN | 207912061 U | | 9/2018 | |
| CN | 109076650 A | | 12/2018 | |
| CN | 208480608 U | | 2/2019 | |
| JP | 2015-504667 A | | 2/2015 | |
| KR | 10-2014-0068808 A | | 6/2014 | |
| KR | 10-2014-0116055 A | | 10/2014 | |
| KR | 10-2014-0123487 A | | 10/2014 | |
| KR | 10-1679489 B1 | | 11/2016 | |
| KR | 10-2018-0070455 A | | 6/2018 | |
| KR | 10-2018-0085365 A | | 7/2018 | |
| KR | 10-2018-0134974 A | | 12/2018 | |
| RU | 2 658 213 C1 | | 6/2018 | |
| TW | 202011844 A | | 4/2020 | |
| WO | 2013/034458 A1 | | 3/2013 | |
| WO | 2018/190607 A2 | | 10/2018 | |
| WO | 2018/217054 A1 | | 11/2018 | |

OTHER PUBLICATIONS

Korean Office Action dated Mar. 21, 2023 in Korean Application No. 10-2023-0012075.
Office Action dated Jul. 11, 2022 issued by the Russian Patent Office in Russian Application No. 2020126243/03.
Office Action dated Jun. 17, 2021 from the Intellectual Property Office of Taiwan in TW Application No. 109113931.
Extended European Search Report dated Dec. 6, 2021 in European Application No. 20746838.0.
Notice of Reasons for Refusal dated Oct. 5, 2021 from the Japanese Patent Office in Japanese Application No. 2020-544230.
International Search Report dated Oct. 14, 2020 issued by the Korean Intellectual Property Office in Application No. PCT/KR2020/005391.
Communication dated Oct. 5, 2020 from the Korean Intellectual Property Office in Application No. 10- 2019-0048608.
Chinese Office Action dated Jul. 26, 2023 in Application No. 202080001466.7.
Communication dated Nov. 21, 2023, issued in Chinese Application No. 202080001466.7.

* cited by examiner

【Figure 1】
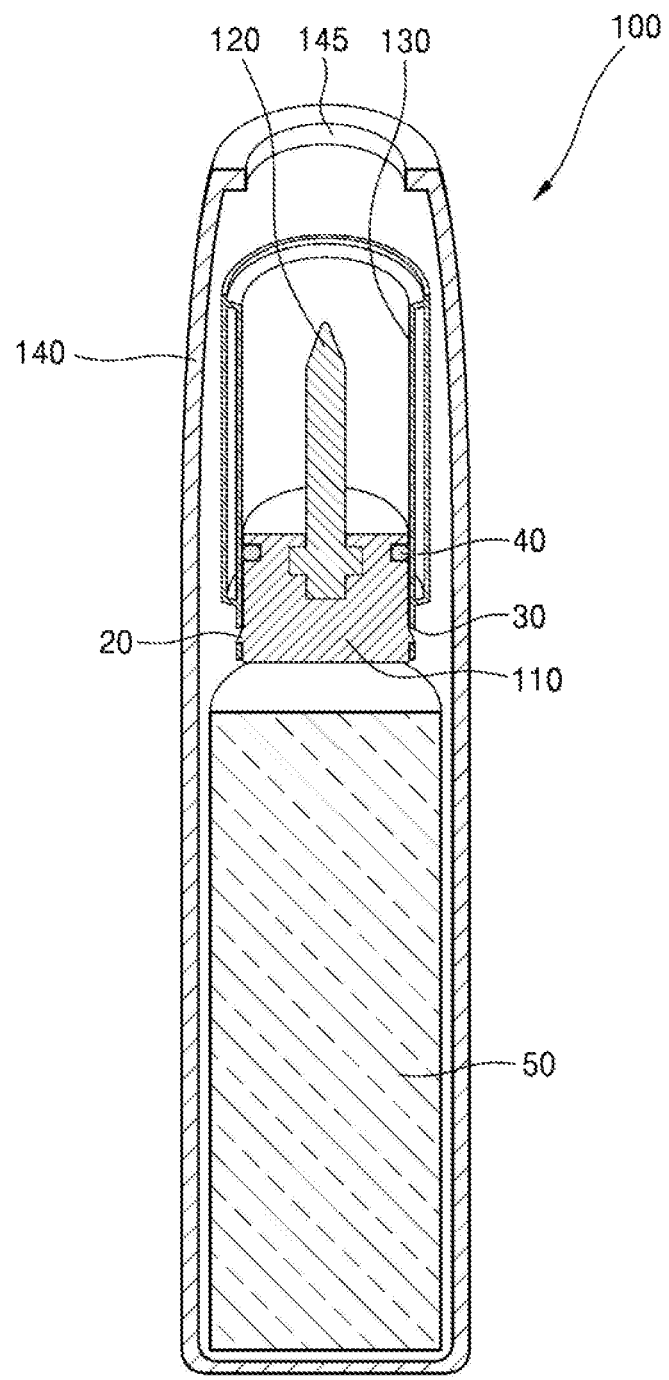

[Figure 2A]
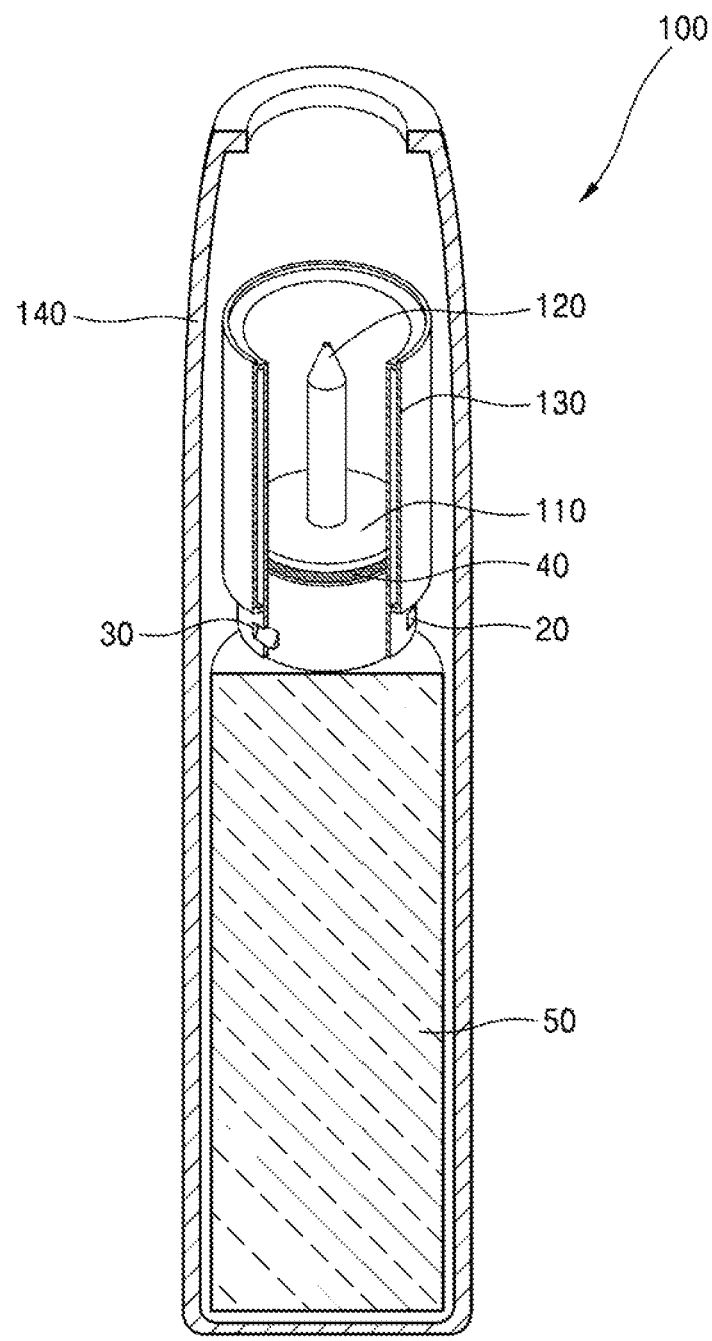

[Figure 2B]
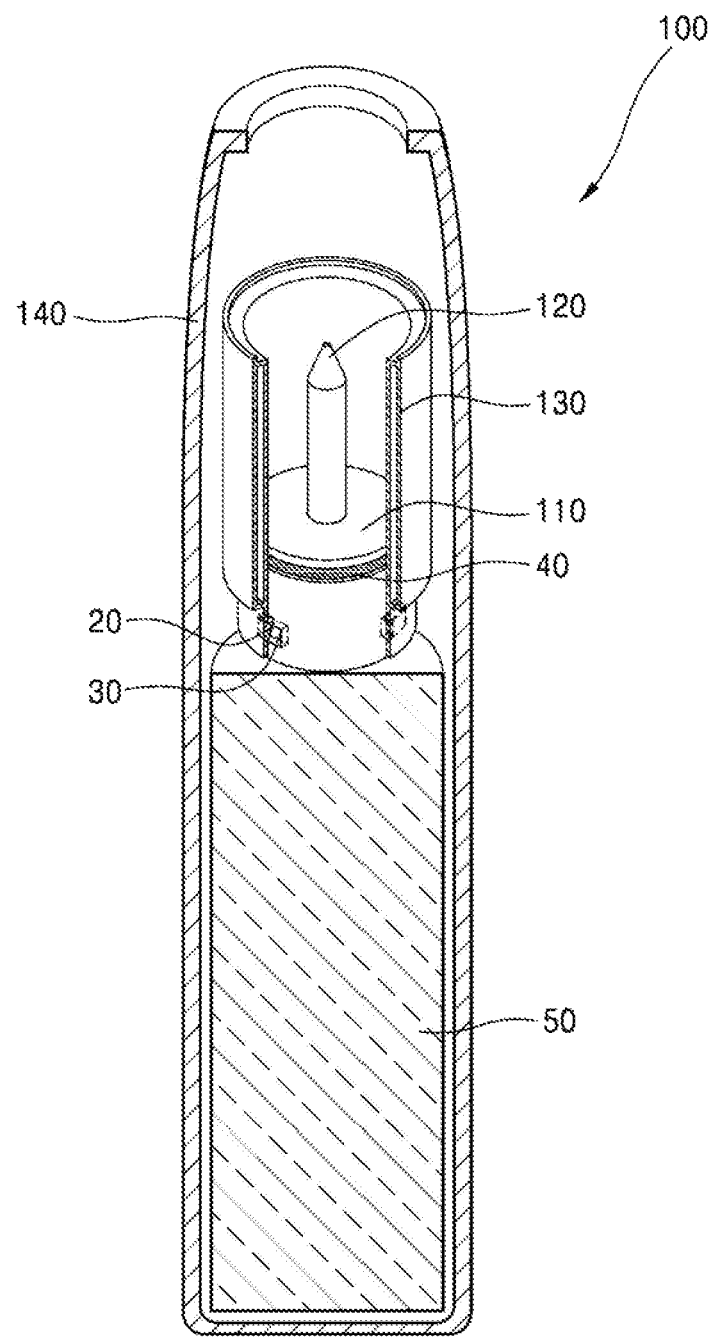

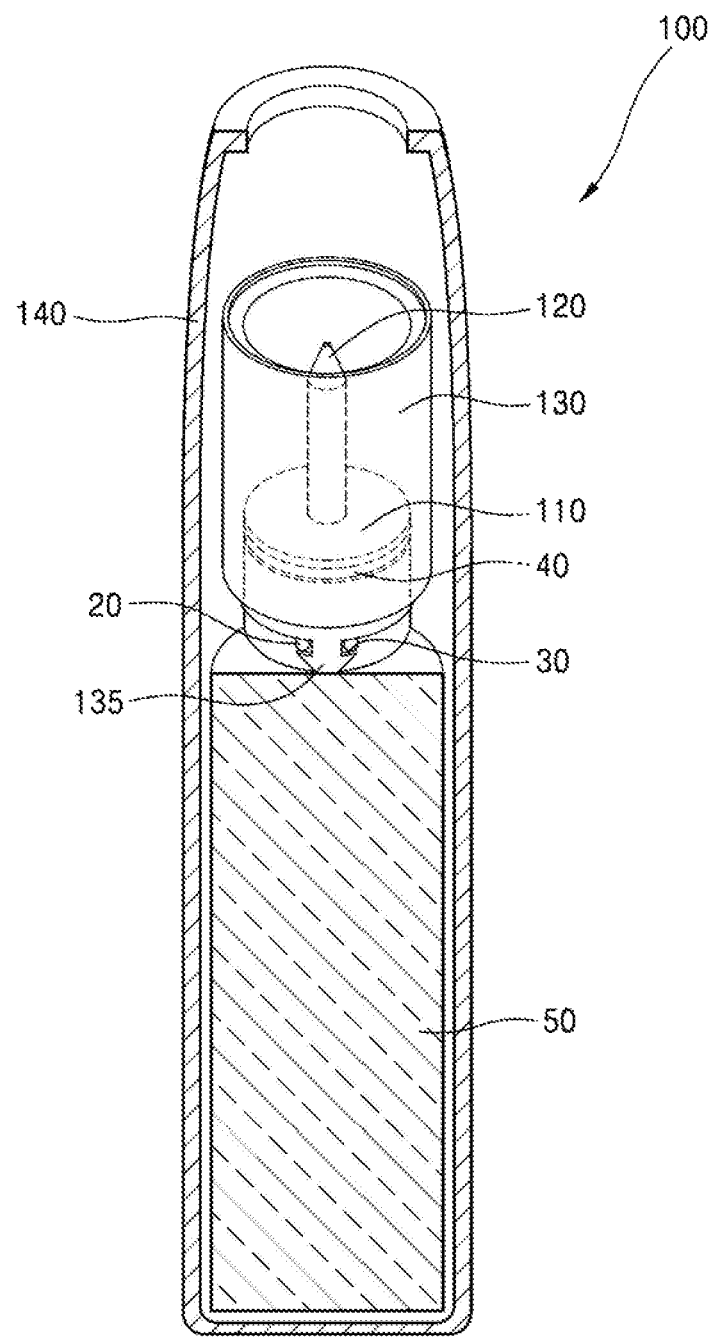
[Figure 2C]

[Figure 3]
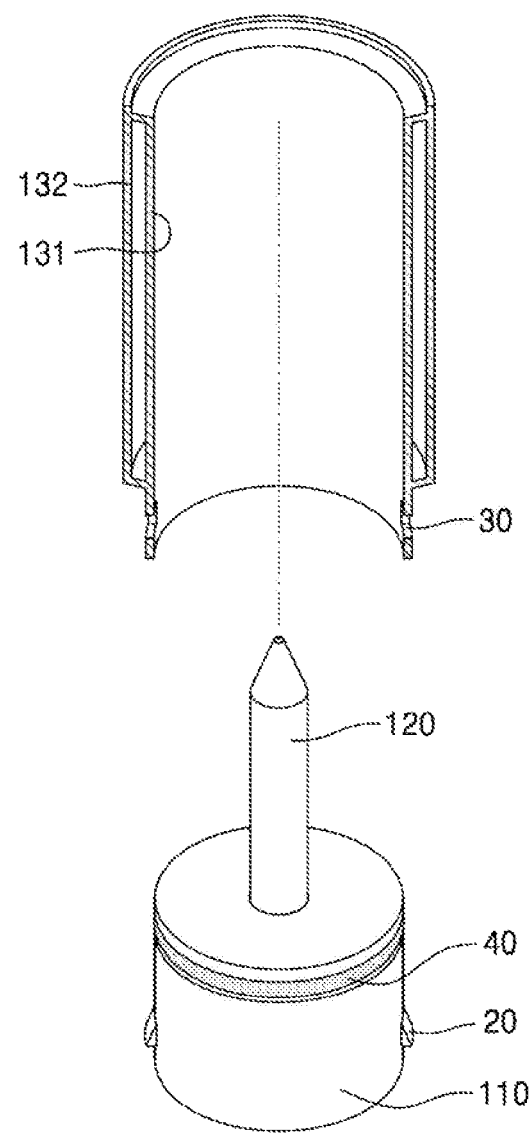

【Figure 4】
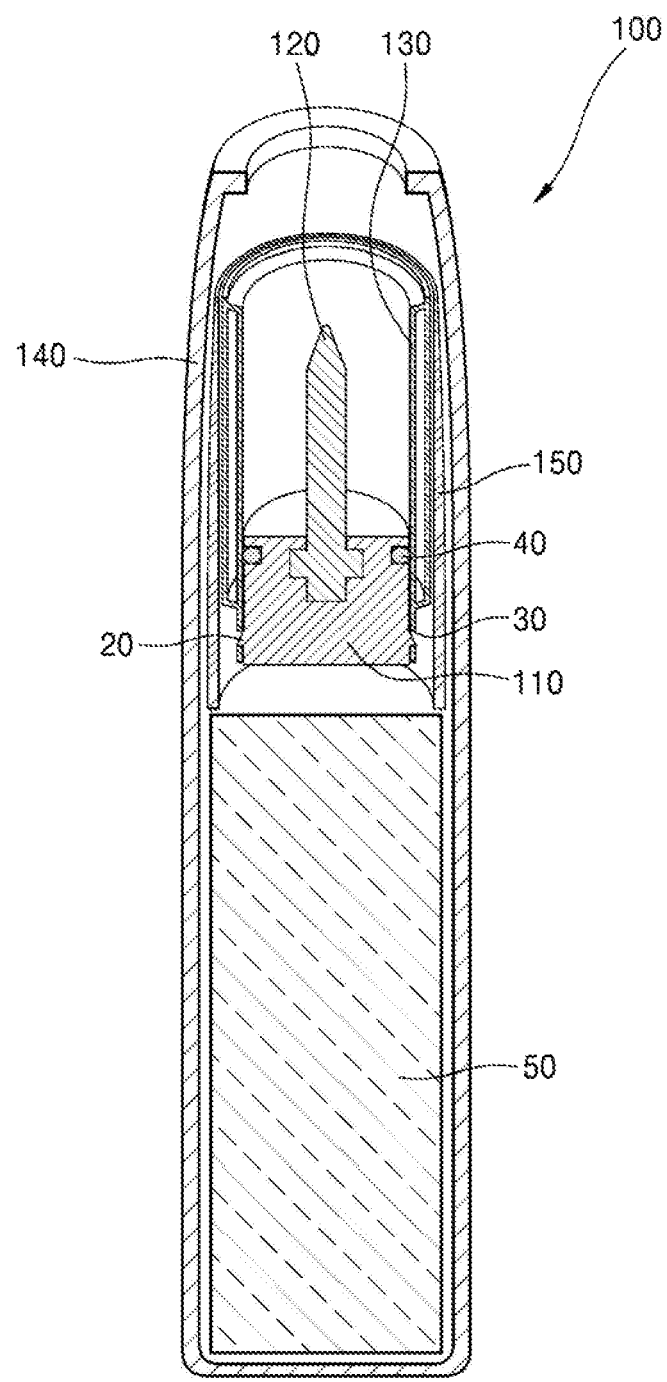

[Figure 5]
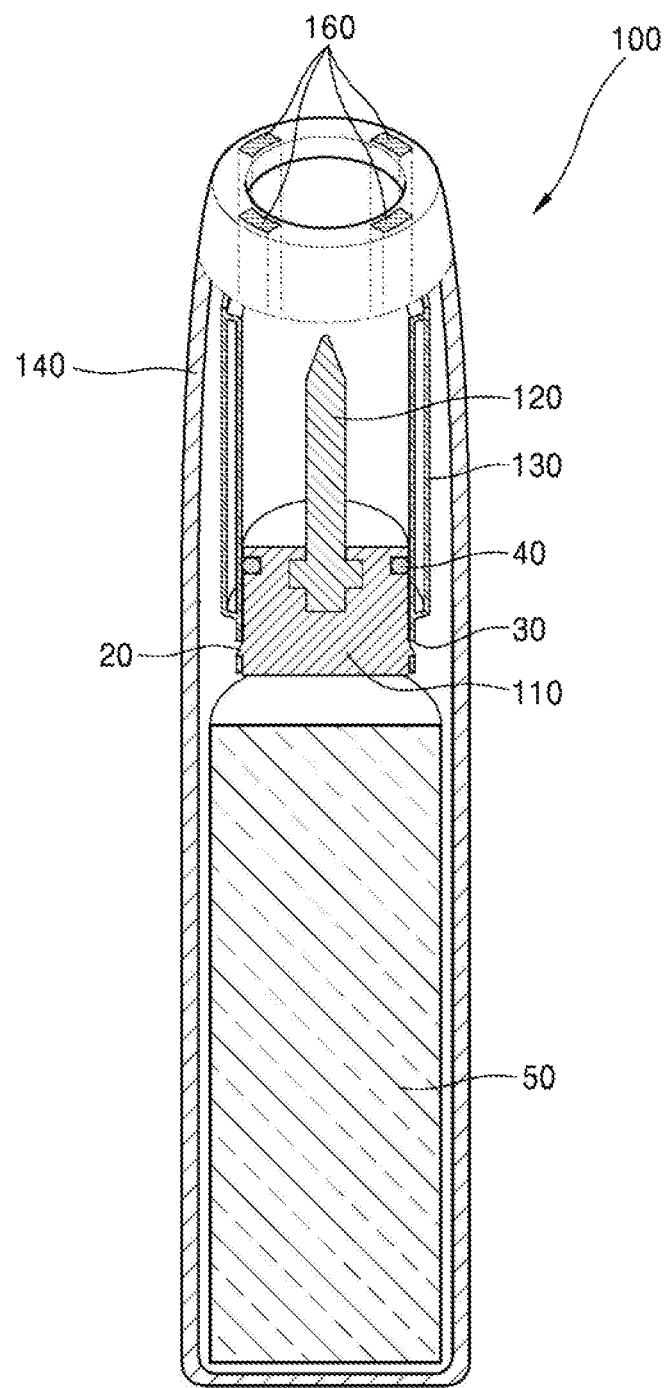

[Figure 6]
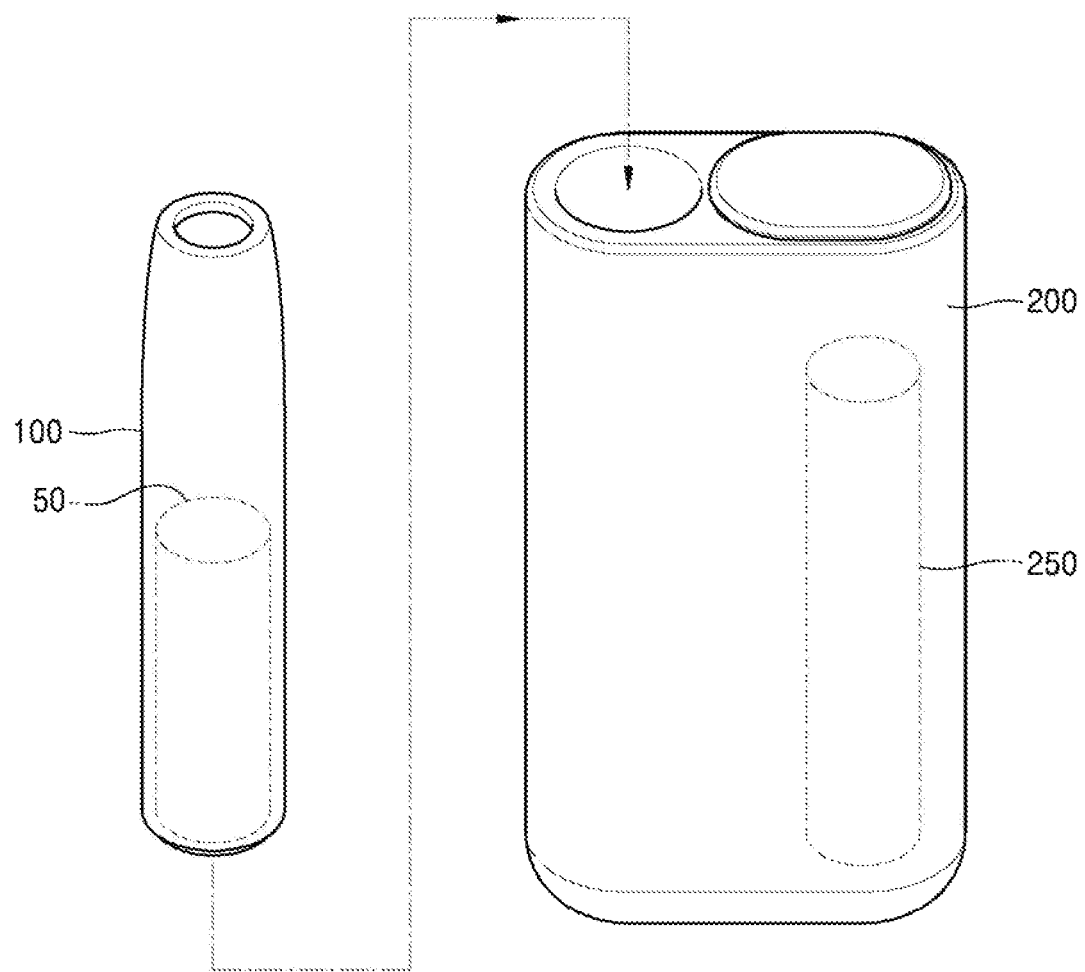

AEROSOL GENERATING DEVICE

CROSS REFERENCE TO RELATED APPLICATIONS

This application is a National Stage of International Application No. PCT/KR2020/005391, filed Apr. 23, 2020, claiming priority to Korean Patent Application No. 10-2019-0048608, filed Apr. 25, 2019.

TECHNICAL FIELD

Example embodiments relate to an aerosol generating device, and more particularly, to an aerosol generating device that effectively blocks heat from being discharged to the outside of the aerosol generating device.

BACKGROUND ART

Recently, the demand for alternative methods to overcome the shortcomings of an aerosol generating article has increased. Especially, there is a growing demand for an aerosol generating device for generating aerosol by heating an aerosol generating material in the aerosol generating article, rather than by combusting the aerosol generating article. Accordingly, studies on a heating-type aerosol generating article and a heating-type aerosol generating device have been actively conducted.

In general, an aerosol generating device includes a heater for heating an aerosol generating article. Accordingly, for safety of the user, there is a need for an efficient way of blocking heat generated by a heater from transferring to the outside of the aerosol generating article.

DISCLOSURE OF INVENTION

Solution to Problem

Example embodiments provide an aerosol generating device including a heater flange and a heat barrier structure that are coupled to each other by combining a fastening member and an accommodating portion.

In addition, example embodiments provide an aerosol generating system including the aerosol generating device and an cradle which accommodates the aerosol generating device and charges a battery of the aerosol generating device.

The technical problems to be solved by the present example embodiments are not limited to the aforementioned technical problems, and other technical problems may be derived from the embodiments described hereinafter.

The aerosol generating device may include a heater configured to heat an aerosol generating article; a heater flange supporting one end of the heater a heat barrier coupled to the heater flange and surrounding the heater without contact; and a housing accommodating the heater and the heat barrier, wherein a fastening member is formed on one of the heater flange and the heat barrier, and an accommodating portion for accommodating the fastening member is formed on the other of the heater flange and the heat barrier, and wherein the heater flange and the heat barrier are coupled to each other by the fastening member and the accommodating portion.

Advantageous Effects of Invention

An aerosol generating device according to the embodiments may include a heat barrier structure which is coupled to a heater flange, wherein one end of a heater is located on the heater flange. Thereby, the heat barrier structure may hermetically seal the heater and the heater flange.

In addition, the aerosol generating devices according to the embodiments provides various methods of combining the heater flange and the heat barrier structure. As can be seen from the various methods, the heater flange and the heat barrier structure are tightly coupled to each other, so that the interior space of the aerosol generating device may be efficiently utilized.

In addition, the aerosol generating device according to the embodiments may provide various types of a heat barrier structure having a tube shape in which the internal space is vacuum. The heat emitted from the heaters may be effectively prevented from being transferred to the housing by the provided heat barrier structure, and a user may use the aerosol generating device without thermal injury or discomfort.

BRIEF DESCRIPTION OF DRAWINGS

FIG. 1 is a cross-sectional view in the longitudinal direction of an aerosol generating device according to an embodiment.

FIG. 2A is a partial cross-sectional view in the longitudinal direction of the aerosol generating device corresponding to an embodiment.

FIG. 2B is a partial cross-sectional view in the longitudinal direction of the aerosol generating device corresponding to another embodiment.

FIG. 2C is a partial cross-sectional view in the longitudinal direction of the aerosol generating device corresponding to yet another embodiment.

FIG. 3 is an exploded view of the heater flange 110 and the heat barrier structure 130 among the components of the aerosol generating device 100 according to an embodiment.

FIG. 4 is a cross-sectional view in the longitudinal direction of the aerosol generating device according to an embodiment.

FIG. 5 is a cross-sectional view in the longitudinal direction of the aerosol-generating device according to another embodiment.

FIG. 6 is a perspective view of an aerosol generating system including a cradle and the aerosol generating device, according to embodiments.

BEST MODE FOR CARRYING OUT THE INVENTION

An aerosol generating device according to an embodiment may include a heater configured to heat an aerosol generating article; a heater flange supporting one end of the heater; a heat barrier coupled to the heater flange and surrounding the heater without contact; and a housing accommodating the heater and the heat barrier, wherein a fastening member is formed on one of the heater flange and the heat barrier, and an accommodating portion for accommodating the fastening member is formed on the other of the heater flange and the heat barrier, and wherein the heater flange and the heat barrier are coupled to each other by the fastening member and the accommodating portion.

An O-ring may be disposed between the heat barrier and the heater flange such that fluid is prevented from leaking between the heat barrier and the heater flange.

The fastening member in the aerosol generating device may be a protrusion formed on an outer circumferential surface of the heater flange, and the accommodating portion may be a groove formed on an inner circumferential surface of the heat barrier.

In addition, the fastening member in the aerosol generating device may be a protrusion formed on an inner circumferential surface of the heat barrier, and the accommodating portion may be a groove formed on an outer circumferential surface of the heater flange.

The accommodating portion may be formed in an extension portion extending from an end of the heat barrier such that a portion of the heater flange is exposed out of the heat barrier when the heater flange is coupled to the heat barrier, and the fastening member may be formed at a position corresponding to the accommodating portion, on an outer circumferential surface of the heater flange.

A length of the heat barrier in a longitudinal direction of the heat barrier may be 1 to 3 times a length of the heater in the longitudinal direction.

The heat barrier may have a tube shape including a first wall facing the heater and a second wall facing the housing, and a space between the first wall and the second wall of the heat barrier may be in a vacuum state.

The heat barrier includes at least one of graphite, ceramic, carbon nanotube, and glass fiber.

The aerosol generating device may further include a tubular member disposed between the heat barrier and the housing, and blocking heat transfer from the heat barrier structure to the housing.

The tubular member may be a pipe including aluminum.

An air gap may be formed between the tubular member and the housing.

The aerosol generating device may include an air flow channel, through which a fluid communication between the outside of the housing and the inside of the heat barrier structure is provided, and the air flow channel may include an air inlet located between an inner wall and an outer wall of the housing.

An aerosol generating system may include the aerosol generating device according to embodiments; and a cradle for accommodating the aerosol generating device and charging the battery of the aerosol generating device.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

FIG. 1 is a cross-sectional view in the longitudinal direction of an aerosol generating device 100 according to an embodiment.

The aerosol generating device 100 according to the embodiment may include a heater 120, a battery 50, a heater flange 110, a heat barrier structure 130, and a housing 140.

The heater 120 heats an aerosol generating article by power supplied from a battery 50. One end of the heater 120 may be located on the heater flange 110. The heat barrier structure 130 may be disposed apart from the heater 120 in the radial direction and coupled to the heater flange 110 at one side. The housing 140 has an opening 145 into which an aerosol generating article is inserted. The aerosol generating article is a device that contains an aerosol generating material that turns into aerosol when heated to a proper temperature. The housing 140 accommodates the heater 120 and the heat barrier structure 130 in its inner cavity. A fastening member 20 may be formed on one of the heater flange 110 and the heat barrier structure 130, and an accommodating portion 30 for accommodating the fastening member 20 may be formed on the other of the heater flange 110 and the heat barrier structure 130. The heater flange 110 and heat barrier structure 130 are fastened by coupling the fastening member 20 and the accommodating portion 30 to each other.

The aerosol generating device 100 according to the embodiment may include the heater 120 which is supplied with power from the battery 50 to heat the aerosol generating article. One end of the heater may be located on and supported by the heater flange 110.

The battery 50 in the aerosol generating device 100 may supply power used to operate the aerosol generating device 100. For example, the battery 50 may supply power to the heater so that the heater 120 may be heated. In addition, the battery 50 may supply power so that a display, a sensor, and a motor installed in the aerosol generating device 100 may operate.

The heater 120 may heat the aerosol generating article by power supplied from the battery 50. The aerosol generating article (e.g., a storage or an atomizer) containing the aerosol generating material may be inserted into the aerosol generating device 100 by a user such that the inserted aerosol generating article may contact the heater 120.

For example, when the aerosol generating article is inserted into the aerosol generating device 100, the heater 120 may be located inside the aerosol generating article. Thus, the heated heater 120 may raise the temperature of an aerosol generating material in the aerosol generating article.

The heater 120 may include an electro-resistive heater. For example, the heater 120 may include an electrically conductive track, and the heater 120 may be heated when currents flow through the electrically conductive track. However, the heater 120 is not limited to the example described above and may include any heaters capable of being heated to a desired temperature. Here, the desired temperature may be pre-set in the aerosol generating device 100 or may be set by a user.

As another example, the heater 120 may include an induction heater. In detail, the heater 120 may include an electrically conductive coil for heating an aerosol generating article by an induction heating method, and the aerosol generating article may include a susceptor which may be heated by the induction heater.

FIG. 1 illustrates that the heater 120 is a rod-shaped, and is arranged along the longitudinal axis of the aerosol generating device 100, but the shape and the arrangement of the heater 120 are not limited thereto. For example, the heater 120 may include a tube-type heating element, a plate-type heating element, a needle-type heating element, or a rod-type heating element, and may heat the inside or the outside of the aerosol generating article, according to the shape of the heating element.

Also, the aerosol generating device 100 may include a plurality of heaters 120. Here, the plurality of heaters 120 may be inserted into the aerosol generating article. Alternatively, the plurality of heaters 120 may be arranged outside the aerosol generating article. Otherwise, some of the plurality of heaters 120 may be inserted into the aerosol generating article, and the others may be arranged outside the aerosol generating article.

One end of the heater 120 may be located on the heater flange 110. The heater flange 110 may support the heater 120 and provide an electrical connection between the heater 120 and the battery 50. The heater flange 110 may also be coupled to the heat barrier structure 130 surrounding the heater 120 as will be described later.

The aerosol generating device 100 according to the embodiment may include a heat barrier structure 130 that is disposed apart from the heater in a radial direction and is combined with the heater flange 110 at one side. The heat barrier structure 130 may be disposed a predetermined distance apart from the heater 120 in the radial direction to surround the heater 120. That is, at least a part of the heater 120 may be located inside the heat barrier structure 130, so that the heat barrier structure 130 may prevent heat emitted from the heater 120 from being directly transferred to the outside of the aerosol generating device 100.

At least a part of the outer circumferential surface of the heater flange 110 and at least a part of the inner circumferential surface of the heat barrier structure 130 may contact each other. For example, as shown in FIG. 1, when the heater flange 110 may have a cylindrical shape, the heat barrier structure 130 may also have a cylindrical shape, so that the inner circumferential surface of the heat barrier structure 130 may closely contact the outer circumferential surface of the heater flange 110. However, the shapes of the heater flange 110 and the heat barrier structure 130 are not limited thereto and may be variously changed.

The aerosol generating device 100 according to the embodiment may include the housing 140 which has the opening 145 into which the aerosol generating article is inserted. The housing 140 may accommodate the heater 120 and the heat barrier structure 130 in its inner cavity. The housing 140 may have the opening 145 that guides the aerosol generating article to be inserted. For example, the opening 145 may be formed at one end of the housing 140, and may have a diameter corresponding to the diameter of the aerosol generating article so that the aerosol generating article may be inserted into the housing 140 through the opening 145.

The inner cavity may be formed in the housing 140. The inner cavity may extend from the opening 145 into the aerosol generating device 100, and may accommodate the heater 120, the heater flange 110, and the heat barrier structure 130 of the aerosol generating device 100.

The housing 140 may form the outer shape of the aerosol generating device 100. The housing 140 may protect components inside the aerosol generating device 100, and the user may use the aerosol generating device 100 by gripping the housing 140. The heat barrier structure 130 is disposed between the housing 140 and the heater 120 to effectively block heat emitted from the heater 120 from being transferred to the user holding the housing 140.

In the aerosol generating device 100 according to the embodiment, the fastening member 20 may be formed on one of the heater flange 110 and the heat barrier structure 130, and the accommodating portion 30 for accommodating the fastening member 20 may be formed on the other of the heater flange 110 and the heat barrier structure 130.

The heater flange 110 and the heat barrier structure 130 may be fastened by coupling the fastening member 20 and the accommodating portion 30 to each other For example, a protrusion that is the fastening member 20 may be formed on the heater flange 110, and the accommodating portion 30 that accommodates the protrusion may be formed on the heat barrier structure 130. The protrusion may protrude from the surface of the heater flange 110 by a predetermined distance, and the accommodating portion 30 may accommodate the protrusion by having a shape corresponding to the shape of the protrusion (i.e., fastening member 20).

The aerosol generating device 100 according to the embodiment may include an O-ring 40. The O-ring 40 may be disposed between the heat barrier structure 130 and the heater flange 110. The O-ring 40 may block droplets formed from the aerosol from flowing in the flange direction. That is, the O-ring 40 may prevent fluid from leaking between the heat barrier structure 130 and the heater flange 110.

A plurality of O-rings 40 may be provided and may be located in one or more concave portions formed on the outer circumferential surface of the heater flange 110. The concave portion and the O-ring 40 may have a substantially same width so that the O-ring 40 tightly fits in the concave portion. As such, a gap between the heater flange 110 and the heat barrier structure 130 may be hermetically sealed, thereby preventing fluid from leaking downwards.

In the aerosol generating device 100 illustrated in FIG. 1, only components related to the present embodiment are illustrated. Accordingly, those of ordinary skill in the art related to present embodiment may understand that additional components other than those shown in FIG. 1 may be further included in the aerosol generating device 100.

For example, the aerosol generating device 100 according to the embodiment may include a controller (not shown). The controller may generally control operations of the aerosol generating device 100. For example, the controller may control operations of the battery 110, the heater 120, and other components included in the aerosol generating device 100. Also, the controller may check a state of each of the components of the aerosol generating device 100 to determine whether or not the aerosol generating device 100 is able to operate.

The controller may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware FIGS. 2A to 2C are partial cross-sectional views in the longitudinal direction of the aerosol generating device 100 corresponding to an example embodiment. Referring to FIGS. 2A to 2C, the fastening aspects of the heater flange 110 and the heat barrier structure 130 in the aerosol generating device 100 according to the embodiment will be described in more detail.

FIG. 2A is a partial cross-sectional view in the longitudinal direction of the aerosol generating device 100 corresponding to an embodiment according to a fastening aspect of the heater flange 110 and the heat barrier structure 130 according to the embodiment.

In the aerosol generating device 100 corresponding to the embodiment, the fastening member 20 may be a protrusion formed on the outer circumferential surface of the heater flange 110, the accommodating portion 30 is a groove formed on the inner circumferential surface of the heat barrier structure 130, and the protrusion may be coupled to the groove.

A plurality of fastening members 20 may be formed along the circumferential direction on the outer surface of the heater flange 110, and the plurality of fastening members 20 may be spaced apart at the same interval. For example, two or four fastening members 20 may be formed on the outer circumferential surface of the heater flange 110.

The fastening member 20 may have, for example, a shape inclined downward. That is, as shown in FIG. 2A, the lower portion of the fastening member 20 may protrude more than the upper portion of the fastening member 20 from the heater flange 110. As such, it is possible to prevent the heater flange 110 from being caught by the fastening member 20 when the heater flange 110 is inserted in the heat barrier structure 130 from the bottom of the heat barrier structure 130.

The fastening member 20 may have elasticity. When the heater flange 110 is inserted into the heat barrier structure 130, the fastening member 20 may be deformed by the pressure from the heat barrier structure 130. For example, the fastening member 20 may be deformed by a predetermined distance such that the heater flange 110 may be inserted into the heat barrier structure 130 without the fastening member 20 being caught by the heat barrier structure 130.

The accommodating portion 30 may be a groove formed on the inner circumferential surface of the heat barrier structure 130. The number of the accommodating portion 30 may correspond to the number of the fastening member 20. For example, four fastening members 20 and four accommodating portions 30 may be provided.

The accommodating portion 30 may have a shape capable of accommodating the fastening member 20. In other words, the fastening member 20 may be fitted in the accommodating portion 30. The position of the accommodating portion 30 may correspond to the fastening member 20. For example, when the fastening member 20 is formed at the heat barrier structure 130, the accommodating portion 30 may be formed on the outer circumferential surface of the heater flange 110 at a position facing the fastening member 20 to accommodate the fastening member 20 of the heat barrier structure 130.

As described above, the aerosol generating device 100 according to the example embodiment may include the O-ring 40. The O-ring 40 may be disposed between the heat barrier structure 130 and the heater flange 110. The O-ring 40 may block the droplets generated from the aerosol from flowing in the downward direction. That is, the O-ring 40 may prevent fluid from leaking between heat barrier structure 130 and the heater flange 110. In this case, the fastening member 20 and the accommodating portion 30 may be formed to be spaced a predetermined distance apart from the position of the O-ring.

FIG. 2B is a partial cross-sectional view in the longitudinal direction of the aerosol generating device 100 according to another embodiment.

In the aerosol generating device 100 corresponding to the embodiment, the fastening member 20 may be the protrusion formed on the inner circumferential surface of the heat barrier structure 130, the accommodating portion 30 is a groove formed on the outer circumferential surface of the heater flange 110, wherein the protrusion may be coupled to the groove.

A plurality of fastening members 20 may be formed along the circumferential direction on the inner surface of the heat barrier structure 130, and the plurality of fastening members 20 may be spaced apart at the same interval. For example, two or four fastening members 20 may be formed on the inner circumferential surface of the heat barrier structure 130.

The protrusion (i.e., the fastening member 20) may have a shape extending from the inner circumferential surface of the heat barrier structure 130 toward the outer circumferential surface of the heater flange 110. The fastening member 20 may be, for example, a prismatic column including a cylinder, but the shape of the fastening member 20 is not limited thereto and may be changed as necessary.

The fastening member 20 may have elasticity, and the fastening member 20 may be deformed by the pressure from the heater flange 110 when the heater 120 is inserted into the heat barrier structure 130. Accordingly, when the heat barrier structure 130 is inserted into the heater flange 110, the fastening member 20 may not be caught by the heater flange 110.

The accommodating portion 30 may be a groove portion formed on the outer circumferential surface of the heater flange 110, the number of the accommodating portion 30 may correspond to the number of the fastening member 20. For example, four fastening members 20 and four accommodating portions 30 may be provided.

The accommodating portion 30 may have a shape capable of accommodating the fastening member 20. In other words, the fastening member 20 may be fitted in the accommodating portion 30. For example, when the shape of the fastening member 20 is a square pillar, the accommodating portion 30 may be a square groove corresponding to the square pillar. It is apparent to those skilled in the art that the shape of the accommodating portion 30 may be changed corresponding to the shape of the fastening member 20 so as to accommodate the shape of the fastening member 20.

The position of the accommodating portion 30 may correspond to the fastening member 20. For example, when the fastening member 20 is formed on the heat barrier structure 130, the accommodating portion 30 may be formed on the outer circumferential surface of the heater flange 110 at a position facing the fastening member 20 to accommodate the fastening member 20.

FIG. 2C is a partial cross-sectional view in the longitudinal direction of the aerosol generating device 100 corresponding to yet another embodiment.

In the aerosol generating device 100 corresponding to the embodiment, the accommodating portion 30 may be formed in an extension portion 135 extending in one direction from the end of the heat barrier structure 130, and the fastening member 20 may be formed on the outer circumferential surface of the heater flange 110 at a position corresponding to the accommodating portion 30 formed in the extension portion 135.

In the aerosol generating device 100 corresponding to the embodiment, a portion of the heater flange 110 may be exposed out of the end of the heat barrier structure 130. That is, as illustrated in FIG. 2C, a portion of the heater flange 110 may be exposed out of the heat barrier structure 130, so that a stepped jaw may be formed between the heater flange 110 and the heat barrier structure 130.

The accommodating portion 30 may be formed in the extension portion 135 extending in one direction from the end of the heat barrier structure 130. The extension portion 135 may extend by a predetermined distance in one direction from the end of the heat barrier structure 130, and the inner surface of the extension portion 135 may contact the exposed portion of the heater flange 110. A plurality of extension portions 135 may be formed at the end of the heat barrier structure 130. For example, there may be two extension portions 135, and the extension portions 135 may be extended in one direction so as to face each other.

The accommodating portion 30 to be coupled with the fastening member 20 may be formed in the extension portion 135. A plurality of accommodating portions 30 may be formed in one extension portion 135. For example, as shown in FIG. 2C, two accommodating portions 30 may be formed in one extension portion 135. That is, as an example, when there are two extension portions 135, a total of four accommodating portions 30 may be formed, and each accommodating portion 30 may accommodate one fastening member 20.

The fastening member 20 on the outer circumferential surface of the heater flange 110 may be formed at a position corresponding to the accommodating portion 30 formed in the extension portion 135. That is, the fastening member 20 may be formed to protrude from the exposed portion of the heater flange 110. As the fastening member 20 is formed on the exposed portion of the heater flange 110, the fastening member 20 may also be exposed out of the heat barrier structure 130.

The fastening member 20 may be a protrusion projecting in the radial direction of the heater flange 110 on the outer circumferential surface of the heater flange 110. For example, the fastening member 20 may be a prismatic column including a cylinder, but the shape of the member 20 is not limited thereto and may be changed as necessary. The fastening member 20 may be accommodated in the accommodating portion 30 to bind the heater flange 110 and the heat barrier structure 130 to each other.

A plurality of fastening members 20 may be formed on the outer circumferential surface of the heater flange 110, and the plurality of fastening members 20 may be spaced apart along the circumferential direction of the heater flange 110 at the same interval. The number of the fastening member 20 may correspond to the number of the accommodating portion 30. For example, four fastening member 20 may be provided when two accommodating portions 30 are formed in each of the two extension portions 135. However, as long as the number of the fastening member 20 and the number of the accommodating portion 30 correspond to each other, the number of the fastening member 20 and the accommodating portion 30 is not limited thereto and may be changed as necessary.

FIG. 3 is an exploded view of the heater flange 110 and the heat barrier structure 130 among the components of the aerosol generating device 100 according to an embodiment.

The aerosol generating device 100 according to the embodiment may include the heater 120, the heater flange 110 that supports one end of the heater 120, and the heat barrier structure 130 which is disposed apart from the heater 120 in the radial direction of the heater 120 and is coupled with the heater flange 110 at one side thereof. The heat barrier structure 130 in the aerosol generating device 100 may surround the heater 120 from a predetermined distance. That is, at least a portion of the heater 120 may be located inside the heat barrier structure 130, and the heat barrier structure 130 may prevent heat emitted from the heater 120 from being directly transferred to the outside of the aerosol generating device 100.

At least a portion of the heater 120 and the heater flange 110 may be inserted into the heat barrier structure 130. Herein, at least a portion of the outer circumferential surface of the heater flange 110 and at least a portion of the inner circumferential surface of the heat barrier structure 130 may contact each other.

As described above, in the aerosol generating device 100 according to the embodiment, the fastening member 20 is formed on one of the heater flange 110 and the heat barrier structure 130, and the accommodating portion 30 for accommodating the fastening member 20 is formed on the other of the heater flange 110 and the heat barrier structure 130. Referring to FIG. 3, the fastening member 20 is formed on the outer circumferential surface of the heater flange 110, the accommodating portion 30 is formed on the inner circumferential surface of the heat barrier structure 130. However, the shape and position of the fastening member 20 and the accommodating portion 30 are not limited thereto.

The fastening member 20 and the accommodating portion 30 are described above with reference to FIGS. 2A to 2C. Accordingly, detailed descriptions in the overlapping ranges are omitted.

In the aerosol generating device 100 according to an embodiment, the height (i.e., a length in the longitudinal direction of the heat barrier structure 130) of the heat barrier structure 130 may be 1 to 3 times the height of the heater 120. As such, the heat barrier structure 130 may cover the entire heater 120, and accordingly, heat emitted from the heater 120 may be more effectively blocked from being transferred to the housing 140.

The heat barrier structure 130 in the aerosol generating device 100 according to the embodiment may be a tube shape including a first wall 131 facing the heater 120 and a second wall 132 facing the housing 140. The space between the first wall 131 and the second wall 132 of the heat barrier structure 130 may be formed in a vacuum state to block heat transfer between the first wall 131 and the second wall 132.

The vacuum state may include low pressure and ultra-low pressure. As the space between the first wall 131 and the second wall 132 of the heat barrier structure 130 is formed in the vacuum state, the thermal conductivity of the heat barrier structure 130 may be reduced. That is, the inner space of the heat barrier structure 130 may be formed in the vacuum state, and accordingly, the thermal conductivity of the heat barrier structure 130 may be reduced.

As the thermal conductivity of the heat barrier structure 130 is reduced, it is possible to effectively prevent heat emitted from the heater 120 from being transferred to the housing 140. As the heat barrier structure 130 having a vacuum tube shape with reduced thermal conductivity is disposed between the housing 140 and the heater 120, it is possible to block heat from being transferred to the user gripping the housing 140, thereby effectively preventing the user from feeling discomfort or getting a thermal injury.

In the aerosol generating device 100 according to the embodiment, the heat barrier structure 130 may include at least one of graphite, ceramic, carbon nanotubes, and glass fibers. Graphite, ceramic, carbon nanotubes, and glass fibers have excellent heat resistance and may be easy to produce in a sheet shape.

Since the heat barrier structure 130 includes at least one of graphite, ceramic, carbon nanotubes, and glass fibers, the thermal conductivity of the heat barrier structure 130 may be reduced, and thus an excellent heat barrier effect may be obtained. In addition, in the aerosol generating device 100 according to an embodiment, the heat barrier structure 130 may be thinly manufactured in a sheet shape, thereby effectively utilizing the internal space of the aerosol-generating device 100. As the thermal conductivity and the volume of the heat barrier structure 130 are reduced, heat emitted from the heater 120 may be effectively prevented from being transferred to the housing 140.

FIG. 4 is a cross-sectional view in the longitudinal direction of the aerosol generating device 100 according to an embodiment.

The aerosol generating device 100 according to an embodiment may include a tubular member 150 which is disposed between the heat barrier structure 130 and the housing 140, and blocks heat transferred from the heater 120 to the housing 140 together with the heat barrier structure 130.

The components of the aerosol generating device 100 other than the tubular member 150 have been described above, and detailed descriptions thereon are omitted.

The tubular member 150 may be disposed between the heat barrier structure 130 and the housing 140 to surround at least a portion of the heat barrier structure 130. As such, the tubular member 150 may block heat transferred from the heater 120 to the housing 140 together with the heat barrier structure 130.

The tubular member 150 may support components in the aerosol-generating device 100. The tubular member 150 is inserted into the aerosol generating device 100 to maintain the position of the components of the aerosol generating device 100, and protect the components in the aerosol-generating device 100 from external impacts, thereby preventing components from being damaged.

The tubular member 150 may be a pipe including aluminum. The material and shape of the tubular member 150 are not limited thereto and may be changed as necessary.

In the aerosol generating device 100 according to an embodiment, an air gap may be formed between the tubular member 150 and the housing 140. The air gap formed between the tubular member 150 and the housing 140 may effectively prevent heat emitted from the heater 120 from being transferred to the housing 140.

The aerosol generating device 100 according to an embodiment may further include an extractor (not shown) that may easily separate the aerosol generating article from the heat barrier structure 130. The extractor may be disposed inside the heat barrier structure 130, contacting the inner circumferential surface of the heat barrier structure 130, and may accommodate the aerosol generating article when the aerosol generating article is inserted into the aerosol generating device 100. The aerosol generating article may be removed while being accommodated in the extractor.

FIG. 5 is a cross-sectional view in the longitudinal direction of the aerosol-generating device 100 according to another embodiment.

In the aerosol generating device 100 according to the embodiment shown in FIG. 5, an air flow channel 160 is formed to facilitate fluid communication between the exterior of the housing 140 and the interior of the heat barrier structure 130. The air flow channel 160 may have an inlet between the inner wall surface and the outer wall surface of the housing 140.

In the aerosol generating device 100 according to an embodiment, in order for the user to inhale the generated aerosol, external air needs to be introduced into the aerosol generating device 100. In the aerosol generating device 100 according to an embodiment, the air flow channel 160 is formed to facilitate fluid communication between the exterior of the housing 140 and the interior of the heat barrier structure 130.

Herein, a plurality of air flow channels 160 may be formed. For example, as shown in FIG. 5, four air flow channels 160 may be formed between the inner wall surface and the outer wall surface of the housing 140, and the four air flow channels may be spaced apart at the same interval.

Alternatively, a single air flow channel may be formed. In this case, the single air flow channel 160 may be an opening extending along the circumference of the top surface of the housing 140, between the inner wall and the outer wall of the housing 140. The shape and number of the air flow channels 160 are not limited to the above-described disclosure and may be changed as necessary.

The position of the air flow channel 160 may be aligned with the position of the inner circumferential surface of the heat barrier structure 130. That is, the radius from the longitudinal axis of the aerosol generating device 100 to the inner circumferential surface of the heat barrier structure 130 and the radius from the longitudinal axis of the aerosol generating device 100 to the air flow channel 160 may be substantially the same.

Accordingly, external air that has passed through the air flow channel 160 may flow to the inner circumferential surface of the heat barrier structure 130. Through the air flow channel 160, fluid may flow in and out of the aerosol generating device 100 between the exterior of the housing 140 and the interior of the heat barrier structure 130.

The air outside the aerosol generating device 100 may flow into the heat barrier structure 130 through the air flow channel 160 formed in the housing 140. The air introduced into the aerosol generating device 100 may be heated by the heater 120 together with the aerosol generating article to generate the aerosol, and the user may inhale the generated aerosol.

FIG. 6 is a perspective view of an aerosol generating system according to an embodiment.

The aerosol generating system according to an embodiment may include the aerosol generating device 100 and the cradle 200 which accommodates the aerosol generating device 100 and charges the battery 50 of the aerosol generating device 100.

The configuration and effects of the aerosol generating device 100 according to the embodiments are as described above, and overlapping descriptions are omitted.

In the aerosol generating system according to an embodiment, the aerosol generating device 100 may be accommodated and charged in the cradle 200. The cradle 200 may include a charging power source 250 therein, and the aerosol generating device 100 may be inserted into the cradle 200 and electrically connected to the charging power source 250 installed in the cradle 200. The battery 50 of the aerosol generating device 100 may be charged by the charging power source 250 in the cradle 200.

The aerosol generating device 100 may provide various methods of combining the heater flange 110 and the heat barrier structure 130. Since the heater flange 110 and the heat barrier structure 130 are tightly coupled to each other, the internal space of the aerosol generating device 100 may be effectively utilized.

In addition, the aerosol generating device 100 may provide various types of heat barrier structure 130 including the tube shape in which the internal space is vacuum. Heat emitted from the heater 120 may be effectively blocked from being transferred to the housing 140 by the heat barrier structure 130, and the user may use the aerosol generating device 100 without thermal injury or discomfort.

Those of ordinary skill in the art pertaining to the present embodiments can understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating device comprising:
   a heater configured to heat an aerosol generating article;
   a heater flange supporting one end of the heater;
   a heat barrier coupled to the heater flange and surrounding the heater without contact; and
   a housing accommodating the heater and the heat barrier,
   wherein a fastening member is formed on one of the heater flange and the heat barrier, and an accommodating portion accommodating the fastening member is formed on the other of the heater flange and the heat barrier,
   wherein the heater flange and the heat barrier are coupled to each other by the fastening member and the accommodating portion,
   wherein the heat barrier has a tube shape including a first wall facing the heater and a second wall facing the housing, and
   wherein a space between the first wall and the second wall of the heat barrier is in a vacuum state.

2. The aerosol generating device of claim 1, wherein an O-ring is disposed between the heat barrier and the heater flange such that fluid is prevented from leaking between the heat barrier and the heater flange.

3. The aerosol generating device of claim 1, wherein
   the fastening member is a protrusion formed on an outer circumferential surface of the heater flange, and
   the accommodating portion is a groove formed on an inner circumferential surface of the heat barrier.

4. The aerosol generating device of claim 1, wherein
   the fastening member is a protrusion formed on an inner circumferential surface of the heat barrier, and
   the accommodating portion is a groove formed on an outer circumferential surface of the heater flange.

5. The aerosol generating device of claim 1, wherein
   the accommodating portion is formed in an extension portion extending from an end of the heat barrier such that a portion of the heater flange is exposed out of the heat barrier when the heater flange is coupled to the heat barrier, and
   the fastening member is formed at a position corresponding to the accommodating portion, on an outer circumferential surface of the heater flange.

6. The aerosol generating device of claim 1, wherein a length of the heat barrier in a longitudinal direction of the heat barrier is 1 to 3 times a length of the heater in the longitudinal direction.

7. The aerosol generating device of claim 1, wherein the heat barrier includes at least one of graphite, ceramic, carbon nanotube, and glass fiber.

8. The aerosol generating device of claim 1, further comprising a tubular member disposed between the heat barrier and the housing, and configured to block heat transfer from the heat barrier to the housing.

9. The aerosol generating device of claim 8, wherein the tubular member is a pipe including aluminum.

10. The aerosol generating device of claim 8, wherein an air gap is formed between the tubular member and the housing.

11. The aerosol generating device of claim 1,
    wherein an air flow channel for fluid communication between outside of the housing and inside of the heat barrier is formed in the housing,
    wherein the air flow channel includes an air inlet located between an inner wall and an outer wall of the housing.

12. An aerosol generating system comprising:
    the aerosol generating device according to claim 1; and
    a cradle configured to charge a battery of the aerosol generating device when combined with the aerosol generating device.

* * * * *